United States Patent [19]

Hansen et al.

[11] 4,316,230

[45] Feb. 16, 1982

[54] MINIMUM SIZE, INTEGRAL, A.C. OVERLOAD CURRENT SENSING, REMOTE POWER CONTROLLER WITH RESET LOCKOUT

[75] Inventors: James E. Hansen, Oak Creek; Walter L. Rutchik, Wauwatosa, both of Wis.

[73] Assignee: Eaton Corporation, Cleveland, Ohio

[21] Appl. No.: 83,159

[22] Filed: Oct. 9, 1979

[51] Int. Cl.³ .............................................. H02H 3/093
[52] U.S. Cl. ..................................... 361/114; 361/72; 361/102; 361/96
[58] Field of Search ................. 361/114, 72, 115, 102, 361/100, 98, 96, 97, 59, 73, 192, 191, 167, 187; 335/13, 169, 173; 307/115, 99

[56] References Cited

U.S. PATENT DOCUMENTS

| | | | |
|---|---|---|---|
| 2,925,536 | 2/1960 | Stineman ............................. | 361/114 |
| 3,706,100 | 12/1972 | Halbeck et al. ..................... | 361/115 |
| 3,706,916 | 12/1972 | Halbeck et al. ..................... | 361/115 X |
| 3,846,676 | 11/1974 | Ryczek et al. ...................... | 361/115 |

Primary Examiner—Patrick R. Salce
Attorney, Agent, or Firm—William A. Autio

[57] ABSTRACT

A reset lockout addition to an A.C. overload current sensing, remote power controller of minimum size and weight and integral construction. Current rate sensing wound toroids are used that are small enough to fit around the line terminal studs without having to enlarge prior insulator space available therein. The electronic overload current detecting and tripping control circuit, is replaced by a pair of modules, detector and control modules, having improved performance and a shape and size such that they fit within the relay housing alongside its operating magnet. The detector module has integrator means for converting current rate of change signals into magnitude indicative signals thereby enabling use therewith of rate sensing wound toroids of about one-tenth the size of equivalent current transformer wound toroids. It fully meets the calibrated step function overload trip time requirements while also providing protection for unusual overload conditions such as varying overloads including pulse accumulation effects or repetitive reset, and simulates the response of a thermal element to prevent excess heating of the wire or load that it is protecting under any overload conditions. Moreover, the control module incorporates a single standard CMOS IC logic element that provides a digital solution to the combinations of control conditions requirements while at the same time reducing the number of conventionally-required cutthroat contacts from two to one and isolating the control input from the relay power circuit. Associated with this logic element is a reset lockout circuit responsive to overload trip that prevents resetting of the relay by the set control switch alone but requires an additional manual operation, that is, momentary opening of a reset switch in conjunction with the opening of the set control switch to reset the relay.

6 Claims, 5 Drawing Figures

MINIMUM SIZE, INTEGRAL, A.C. OVERLOAD CURRENT SENSING, REMOTE POWER CONTROLLER WITH RESET LOCKOUT

CROSS REFERENCE TO RELATED APPLICATION

This application is a modification of W. L. Rutchik et al copending application Ser. No. 923,325, filed July 10, 1978 and now abandoned.

BACKGROUND OF THE INVENTION

Overload current sensing electric controllers have been known heretofore. However, prior devices of this type have been of rather large size and weight. This is for the reason that the contactor or relay was enclosed in one housing and the tripping control circuit was enclosed in another housing which were separately attached to a mounting panel. The overload current transformer wound toroids were placed around the three-phase load conductors and connected to the tripping control circuit and the latter was connected to the relay by electrical conductors. This not only involved large size and weight but also required a rather large amount of panel mounting space.

While these prior devices have been useful for their intended purposes, this invention relates to improvements thereover.

SUMMARY OF THE INVENTION

An object of the invention is to provide an improved remote power controller for remote control and protection of an electrical line or load.

Another object of the invention is to provide an improved overload current trip function by incorporating electronic modules into a standard relay configuration thereby to provide an integral device having an added reset lockout feature but of minimum physical size and weight.

Another object of the invention is to provide an integral electronic signal processor of the aforementioned type incorporating means providing a digital solution to the control requirements including reset lockout by using a standard CMOS IC logic element that eliminates the need for one of the usual cutthroat contacts and isolates the control input from the relay coil power circuit.

Another object of the invention is to provide a remote power controller incorporating reset lockout and an interruptable operating power input for releasing such lockout to allow resetting in the normal manner.

Other objects and advantages of the invention will hereinafter appear.

DESCRIPTION OF THE PREFERRED EMBODIMENT

Figure 1:
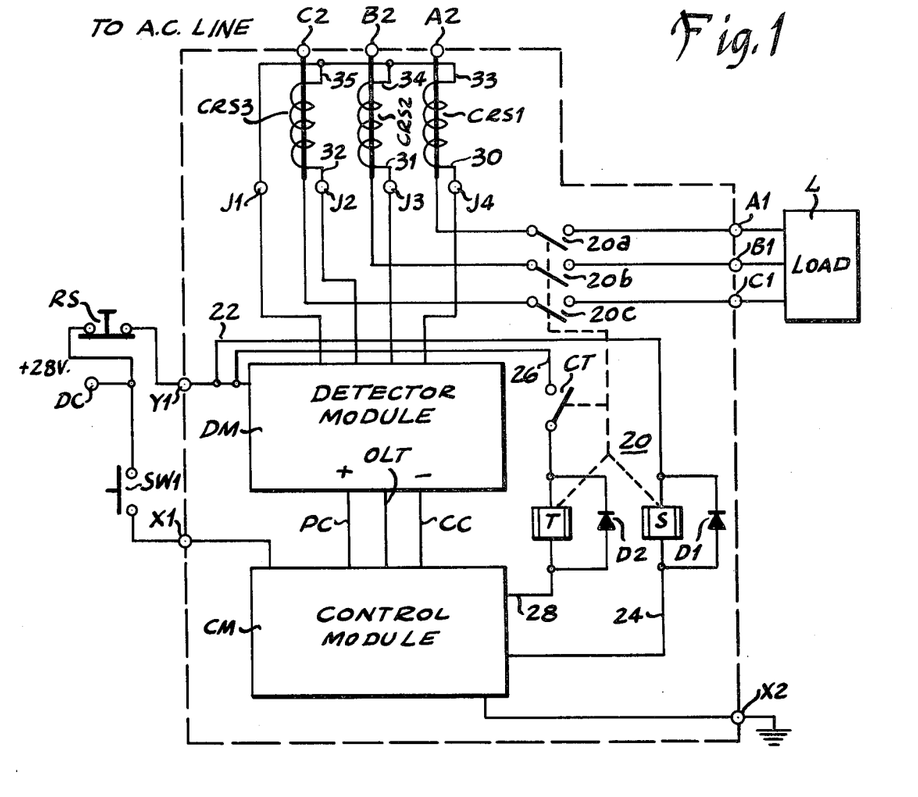
FIG. 1 is a partly block and partly schematic diagram showing the relationship of the remote power controller to a three-phase A.C. power line supplying a load.

Referring to FIG. 1, there is shown an overload current sensing, remote power controller connectable to a three-phase power line for supplying a load. The load may be any typical A.C. type load such as a three-phase A.C. motor or resistive or inductive load or the like. Power controllers of this type are also generally known as starters, electric or motor controllers, overcurrent protective relays, or contactors, overload current protective relays or contactors, or the like.

As shown generally in FIG. 1, the remote power controller is provided with three load terminals A1, B1 and C1 that are normally connected to a three-phase Load L and three line terminals A2, B2 and C2 that are connectable to a three-phase power line. Line terminals A2, B2 and C2 are connected through normally-open contacts 20a, 20b and 20c of an overload relay 20 to load terminals A1, B1 and C1, respectively. When these contacts are open as shown, power is disconnected from the load and when these contacts are closed, power is connected to energize the load.

Relay 20 is of the bistable type and is provided with a set coil S, a trip coil T, and a cutthroat contact CT in addition to its three power control contacts 20a-c as indicated by the broken lines in FIG. 1 connecting these elements. Contact CT is normally-open and in series with the trip coil. When the set coil is momentarily energized, the relay motor causes all four contacts to close and are magnetically latched in known manner. The three power contacts connect power from the line to the load and cutthroat contact CT prepares the trip coil circuit for opening the relay contacts as hereinafter described. When the trip coil is energized, the relay motor transfers to the opposite state, causing all four contacts to reopen and are magnetically latched open also. Diodes D1 and D2 across the respective set and trip coils are poled to conduct current in response to the induced voltage when these coil circuits are opened.

The electronic circuit of the remote power controller is included on two modules shown in FIG. 1 as a detector module DM and a control module CM. Direct current operating power is supplied to the remote power controller from a source DC of 28 volts through a momentary-type normally-closed reset switch RS to terminal Y1. This operating power is required to "trip" the relay when an overload occurs as hereinafter described. Therefore, reset switch RS must be a normally-closed, momentary type so that power is normally available. From terminal Y1, this power is connected to detector module DM, and also through conductor 22 to set coil S, the other side of which is connected through conductor 24 to control module CM, and also through conductor 26 to cutthroat contact CT, the other side of which is connected through trip coil T and conductor 28 to control module CM. This operating power is also connected as a control signal, when set-control switch SW1, which is a maintained type, is closed, through trip indicator TI and terminal X1 to control module CM, whereby the remote power controller closes (sets). When control switch SW1 is opened, the remote power controller opens (trips). The direct current operating power is connected from detector module DM through positive voltage conductor PC and grounded or common conductor CC to control module CM and the latter is connected to ground at terminal X2.

The remote power controller disclosed herein has four conditions or states that are defined as follows. The term "closes" (sets) means that the relay power contacts close to connect power from the A.C. source to the load. The term "opens" (trips) means that the relay power contacts open to disconnect the A.C. power from the load. The term "reset" means a condition or state of the circuit from which it can be turned directly "on", that is closing or setting the relay by merely closing the control switch. The term "lockout" means a condition or state from which the relay cannot be reset by manipulation of the control switch alone.

Current rate sensing wound toroids CRS1, CRS2 and CRS3 surround terminals A2, B2 and C2, respectively, to sense the changing value of A.C. current therein. The coils of these toroids are connected at first sides thereof through conductors 30, 31 and 32 to terminals J4, J3 and J2, respectively, and at their other sides through conductors 33, 34 and 35 to common terminal J1 as shown in FIG. 1. Terminals J2, J3, J4 and J1 are connected internally of the remote power controller to detector module DM as hereinafter described in connection with FIG. 2. And detector module DM is connected through a conductor OLT to control module CM to pass the overload trip signal as hereinafter described in more detail.

As schematically shown in FIG. 1, the remote power controller is an integral device enclosed by the broken line which represents the single enclosure shown in Rutchik et al application Ser. No. 923,325, filed July 10, 1978, that houses both the relay and the electronic circuit that controls it. The terminals connected by this broken line are external terminals of the remote power controller unit to which connections are made from the A.C. and D.C. power supplies, the load, the remote control switch and ground. This integral construction provides a unit of minimum size and weight as will hereinafter appear.

ELECTRONIC CIRCUIT

Figure 2:
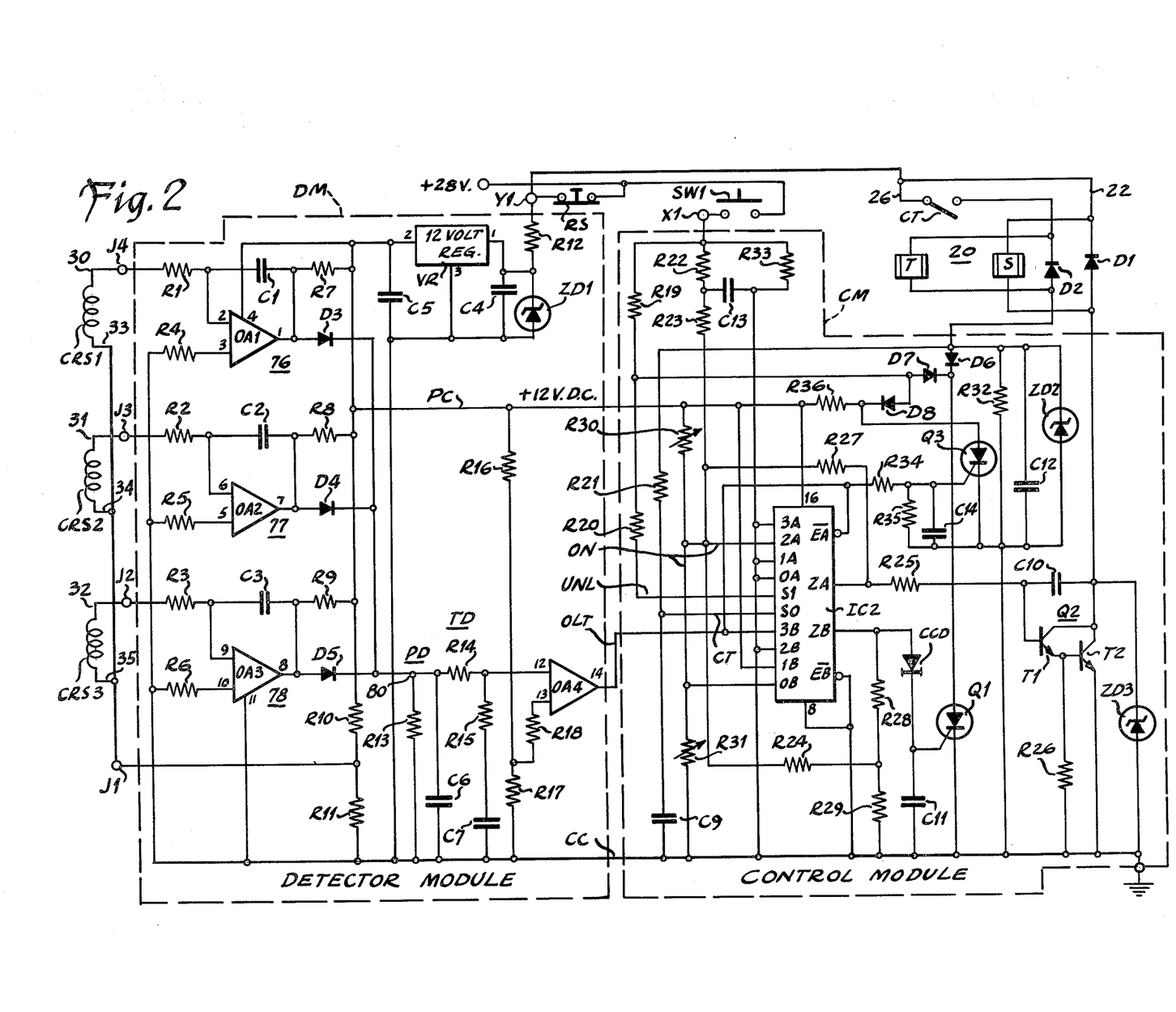
FIG. 2 is a schematic diagram of the solid state electronic circuit integrally included in the two electronics modules within the housing of the remote power controller of FIG. 1.

The circuit diagrams of detector module DM and control module CM are shown in FIG. 2. As shown therein, current rate sensing wound toroids CRS1, CRS2 and CRS3 are connected at one side thereof through conductors 30, 31 and 32 to terminals J4, J3 and J2, respectively, and at the other side thereof are connected through conductors 33, 34 and 35 to common terminal J1, these connections being also shown in FIG. 1.

DETECTOR CIRCUIT

Overload signal input terminals J4, J3 and J2 are connected to means for converting the rate-of-change of current signals of the three phases of the power line to voltages indicative of and proportional to the current of the line conductors. This means comprises three self-biasing integrators 76, 77 and 78, one for each phase of the power line. These integrators are alike and each comprises an operational amplifier OA1, OA2 or OA3, an input resistor R1, R2 or R3 connecting its coil terminal J4, J3 or J2 to its inverting input 2, 6 or 9, and an integrating capacitor C1, C2 or C3 connected between its inverting input 2, 6 or 9 and its output 1, 7 or 8. Ground is connected through a balancing resistor R4, R5 or R6 to its non-inverting input 3, 5 or 10, and a loading resistor R7, R8 or R9 connects a 12 volt D.C. power conductor PC to its output 1, 7 or 8. A bias circuit is connected from D.C. power conductor PC through voltage dividing resistors R10 and R11 to common conductor CC. A small bias voltage such as 5 millivolts or the like is applied from the junction of resistors R10 and R11 through the rate sensing wound toroids and input resistors to the inverting inputs of amplifiers OA1, OA2, and OA3 while their non-inverting inputs are connected through reference voltage resistors R4, R5 and R6 to ground at common conductor CC. This bias insures that the outputs of the operational amplifiers are normally clamped at low voltage level or ground, in the event of drift or offset or the like that might occur within these operational amplifiers. These outputs are connected through OR-logic diodes D3, D4 and D5 to a peak detector circuit PD hereinafter described.

The four operational amplifiers OA1-4 used in the detector module constitute an array of four operational amplifiers on an integrated circuit (IC) chip. Therefore, although positive voltage is shown as being connected from conductor PC only to terminal 4 of amplifier OA1 and only terminal 11 of amplifier OA3 is shown as connected to ground at common conductor CC, it may be assumed that these D.C. power connections are made within the IC chip to all four operational amplifiers. This power is applied from terminal Y1 through a 12 volt regulator VR to positive conductor PC. For this purpose, terminal Y1 is connected through a resistor R12 and a voltage limiting zener diode ZD1 of 33 volts rating or the like to common conductor CC. A filter capacitor C4 is connected across zener diode ZD1 to smooth the D.C. voltage. The junction between resistor R12 and capacitor C4 is connected to input 1 of 12 volt regulator VR whose output 2 is connected to positive voltage conductor PC, and whose common terminal 3 is connected to common conductor CC. A stabilizing capacitor C5 is connected from output 2 of the regulator to common conductor CC. Regulator VR is preferably a positive voltage regulator such as a Fairchild μA78L12AHC linear integrated circuit 3-terminal positive voltage regulator, or the like.

Figure 3:
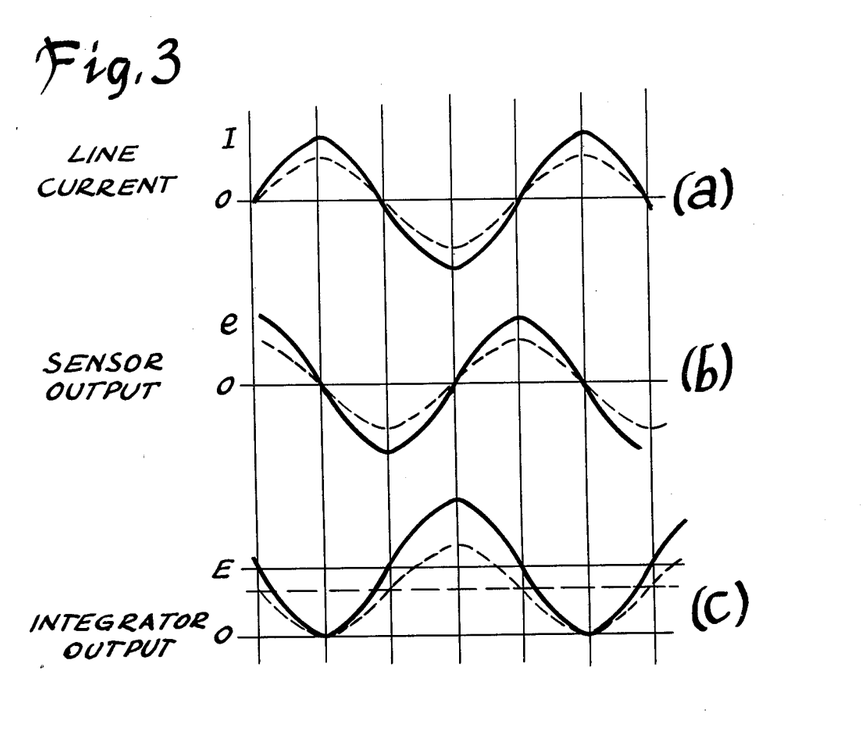
FIG. 3 is a graph showing operating characteristics of the detector module of FIG. 2.

The line currents on the three-phase power line are sine waves one of which is shown by curve (a) in FIG. 3, the solid and broken line sine wave therein depicting high and low amplitudes of line current. The rate sensing wound toroids pick up the rate of change in the line currents and provide input voltage signals proportional to such rate of change, one of which is shown by curve (b) in FIG. 3, the solid and broken line sine waves therein depicting high and low amplitudes of input voltages for the respective line current sine waves (a) in FIG. 3. Thus, the input voltage signals coming from the three current rate sensing wound toroids to the inverting inputs of the three operational amplifiers are three sine waves. Since the inverting input is biased 5 millivolts positive with respect to the non-inverting input which is grounded, the output of each operational amplifier is clamped low. The voltage signals at the outputs of the three operational amplifiers are positive waves that are clamped integrals of the respective input signals. One of these outputs voltage signals is depicted by curve (c) in FIG. 3 which is an integral of curve (b) in FIG. 3, the solid and broken line sine waves therein depicting high and low amplitudes of output signal for the respective input voltage waves (b) in FIG. 3. Since the output voltage signals are integrals of the respective input signals, they are proportional to the peak to peak line current amplitudes. These output voltages of the integrators are applied to diodes D3, D4 and D5.

Figure 4:
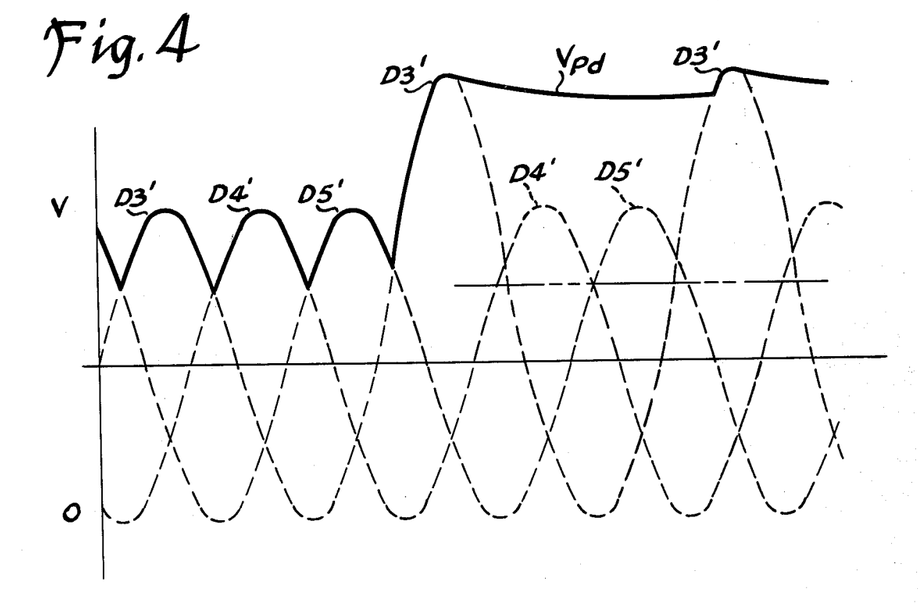
FIG. 4 is a graph showing an overload characteristic on one phase of the three-phase power line of FIG. 1.

These diodes D3, D4 and D5 constitute an OR-logic circuit that will pass that one of the output voltages of the three integrators that has the highest amplitude as shown in FIG. 4. These voltages in FIG. 4 are marked D3′, D4′ and D5′ to relate them to diodes D3, D4 and D5, respectively. It will be seen in FIG. 4 by the heavy line contour that when wave D3′ is higher than the other two, it will be passed by diode D3 to peak detector PD. Next, wave D4′ is higher than the other two and will be passed by diode D4. Next, wave D5′ is higher than the other two and will be passed. Next, an overload occurs on one line and wave D3′ jumps much higher than the other two and will be passed by diode D3 to the peak detector.

This peak detector comprises a capacitor C6 and resistor R13 in parallel between input 80 and common conductor CC. The OR-logic diodes pass the highest amplitude voltage signal or peak of the three integrator outputs and capacitor C6 charges rapidly to such peak value which appears as a voltage at terminal 80.

As shown in FIG. 4, wave D3′ jumps up high and quickly charges capacitor C6. This capacitor then discharges slowly through high resistance R13 as shown by the gradual down-slope of curve Vpd (peak detector voltage). Since capacitor C6 is now charged to a voltage higher than either phases D4′ or D5′, these have no effect thereon. When phase D3′ comes again, capacitor C6 is again charged quickly to its full amplitude and starts a gradual discharge.

This voltage on capacitor C6 causes current flow through resistors R14 and R15 to charge capacitor C7 of an RC time delay circuit TD. The output of this time delay circuit is a voltage that is proportional to and simulates the temperature caused by the heating effect of the overload current on the line or load being protected. This time delayed signal is a calculated value that provides an analog simulation of a trip-free, compensated, thermal, circuit breaker. For this purpose, the charging time of capacitor C7 is proportional to the heating time on such line or load. Capacitor C7 discharges through resistors R15, R14 and R13 which is proportional to the cooling time of such line or load.

This temperature signal derived from trip time delay circuit TD is applied to non-inverting input 12 of operational amplifier OA4 which serves as a comparator. Trip time delay circuit TD comprises resistors R14 and R15 and a capacitor C7 connected in series from terminal 80 to common conductor CC with the junction between these resistors being connected to non-inverting input 12 of amplifier OA4.

A reference voltage is applied to the inverting input of amplifier OA4 so that the temperature signal voltage must rise to a predetermined value before an overload trip signal OLT is developed. For this purpose, positive 12 volts is applied from conductor PC through voltage divider resistors R16 and R17 to common conductor CC, with the junction between these resistors being connected through resistor R18 to inverting input 13 of amplifier OA4. As a result, the output of this amplifier is biased normally "low". When the temperature signal on non-inverting input 12 exceeds such reference voltage requiring tripping, amplifier output 14 provides an overload trip signal OLT which is a "high" to control module CM to cause tripping of the relay as hereinafter described.

CONTROL CIRCUIT

Control module CM is provided with a dual 4-input digital multiplexer IC2 such as a Fairchild CMOS Type F4539 or the like. As its name implies, this device has two multiplexer units in one chip.

Each of these multiplexer units operates in accordance with the following truth table:

| TRUTH TABLE | | | |
|---|---|---|---|
| INPUTS | | | OUTPUT |
| S0 | S1 | $\overline{E}$ | Z |
| X | X | H | L |
| L | L | L | 0 |
| H | L | L | 1 |
| L | H | L | 2 |
| H | H | L | 3 |

H = High Level
L = Low Level
X = Don't Care

In other words, each multiplexer A and B has four data inputs 0, 1, 2 and 3, a data ouput Z and an active "low" enable input $\overline{E}$, and the two multiplexers have a pair of select inputs S0 and S1 in common that function on a binary basis to route data from selected inputs of the two multiplexers to their respective outputs. In other words, as shown in the above truth table, when a "high" (inhibit) is applied to the enable input, the corresponding output goes "low" regardless of any signal on the select inputs. When the enable input is "low", the select inputs can control multiplexing, that is, routing of selected input data to the corresponding output. For this purpose, when both select inputs S0 and S1 are "low", (binary 00), the input 0 signals (data) are routed to the respective outputs. When select inputs S0 and S1 are "high" and "low", respectively, (binary 01) the input 1 signals are routed to the respective outputs. When select inputs S0 and S1 are "low" and "high", respectively, (binary 10) the input 2 signals are routed to the respective outputs. And when select inputs S0 and S1 are both "high", (binary 11) the input 3 signals are routed to the respective outputs.

As shown in FIG. 2, dual 4-input digital multiplexer IC2 is supplied with operating power from positive 12 volt conductor PC to its terminal 16 while its common terminal 8 is connected to ground at conductor CC.

Enable input $\overline{EB}$ of the B multiplexer unit is also connected to ground at conductor CC for reasons hereinafter apparent.

SET ACTION

The set action of this two-unit digital multiplexer is defined by the following Boolean equation:

SET = UNL·$\overline{CT}$·$\overline{OLT}$·ON

These four AND conditions must be present in order to obtain the set action of relay 20. First, the control signal UNL must be high, that is, switch SW1 closed, SCR Q3 and SCR Q1 off. This signal is applied from the positive 28 volt source through control switch SW1 which is of the maintained type, rather than momentary type, and resistors R19 and R20 to select input S1 of the multiplexer.

Secondly, cutthroat contact CT must be open, meaning that the relay contacts are open. As a result of contact CT being open, a "low" is applied from common conductor CC through zener diode ZD2 and resistor R21 as a NOT CT signal to select input S0 of the multiplexer, small capacitor C9 to ground suppressing noise.

Thirdly, an overload trip signal must not be coming from detector module DM, indicated by a NOT OLT signal. If such overload trip signal OLT, a "high", were present, it would be applied as an inhibit to enable input EA to keep output ZA "low" in accordance with the above truth table, thereby to prevent setting of the relay.

Fourthly, the set control input signal must be "on". This signal ON is applied as a "high" from the 28 volt supply through switch SW1 and resistors R22 and R23 to input 2A, the latter being connected to hysteresis feedback resistors R24 and R27.

The two select inputs S0 and S1 now having a "low" and a "high" signal, respectively, as aforesaid, data at inputs 2A and 2B of the two multiplexer units are now routed to the respective outputs ZA and ZB, according to the above truth table. Since input 2B is grounded, along with inputs 0A, 1A and 3A as shown in FIG. 2, output ZB is "low" and without effect. However, input 2A is receiving the aforesaid "high" ON signal so that output ZA goes "high" and is applied through resistor R25 to the base of transistor T1 of Darlington pair Q2 to turn it on, current flowing therethrough and through resistor R26. The "high" at output ZA is also fed back through resistor R27 to input 2A to increase the ON signal providing hysteresis. Capacitor C10 between the base and collector of transistor T1 suppresses noise. The conduction of transistor T1 turns transistor T2 "on" to energize set coil S of the relay. For this purpose, current flows from the 28 volt source through reset switch RS, conductor 22, set coil S and transistor T2 to ground. This set coil closes power contacts 20a, 20b and 20c in FIG. 1 as well as cutthroat contact CT in FIG. 2 and the relay magnetically latches these contacts closed. Zener diode ZD3 across transistor T2 protects the latter from high voltage peaks.

Since the relay is now latched closed, Darlington pair Q2 may be turned off. This occurs in response to the aforesaid closure of contact CT which removes the "low" and applies a "high" to select input S0 of the multiplexer. As a result, both select inputs S0 and S1 now have "highs" whereby data at inputs 3A and 3B are routed to the respective outputs ZA and ZB. Since input 3A is at ground, a "low", Darlington pair Q2 is turned "off" but the relay remains latched as aforesaid until the trip coil is energized. Since input 3B is connected to overload trip conductor OLT coming from the detector module, the system is now in readiness to trip in response to an overload signal.

TRIP ACTION

The trip action of this two-unit digital multiplexer is defined by the following Boolean equation:

$$\text{TRIP} = \text{UNL·CT·OLT} + \overline{\text{UNL}}\cdot\overline{\text{CT}}\cdot\text{ON} + \overline{\text{UNL}}\cdot\text{CT}$$

The first set of three AND conditions UNL·CT·OLT indicates an overload trip. This means that in order to trip the relay, the control signal UNL must be "on", cutthroat contact CT must be closed, and an overload trip signal must be received from the detector module. For this purpose, a "high" is applied from the 28 volt source through set switch SW1 and resistors R19 and R20 as a signal UNL to select input S1. Also a "high" is applied from the 28 volt source through reset switch RS, cutthroat contact CT, trip coil T and resistor R21 to select input S0. With "highs" on both select inputs, data on multiplexer inputs 3A and 3B are routed to the respective outputs. Since input 3A is connected to ground, output ZA is "low" and ineffective. However, an overload trip signal OLT "high" at input 3B is routed to output ZB and applied through constant current diode CCD to the gate of silicon controlled rectifier (SCR) Q1 to fire it into conduction. As a result, trip coil T is energized by current flow from the 28 volt source through reset switch RS, contact CT, coil T, diode D6 and SCR Q1 to ground. Capacitor C11 connected from the gate of SCR Q1 to ground prevents inadvertent firing of the SCR. Trip coil T reopens power contacts 20a, 20b and 20c in FIG. 1 as well as contact CT. However, SCR Q1 is maintained conducting by anode current supplied from the 28 volt source through switch SW1, resistor R19 and diode D7.

The second set of three AND conditions $\overline{\text{UNL}}\cdot\overline{\text{CT}}\cdot\text{ON}$ indicates maintenance of the tripped condition so that the relay will not reset automatically in consequence of a transient loss of the said maintaining anode current. For this purpose, it will be recalled from the above overload trip action that controlled rectifier Q1 was rendered conducting and was maintained conducting by supplying D.C. anode current from the 28 volt source through switch SW1, resistor R19 and diode D7. This conduction of rectifier Q1 drops the voltage at the junction between resistors R19 and R20 near ground and, consequently signal UNL goes to $\overline{\text{UNL}}$, thus establishing the first of the three AND conditions above. As a result, select input S1 goes from "high" to "low". Since the cutthroat contact is open, the second AND condition $\overline{\text{CT}}$ is present, causing select input S0 to go "low". And switch SW1 being still maintained closed, the third AND condition ON is present, providing a "high" on multiplexer input 0B.

Both select inputs S0 and S1 now having "lows", data on inputs 0A and 0B are routed to the respective outputs. Since input 0A is grounded, output ZA remains "low" so that the set coil is not energized. Signal ON which is a "high" on input 0B is routed to output ZB to maintain controlled rectifier Q1 fired into conduction and the relay tripped. The "high" at output ZB is also fed back from the junction of voltage divider resistors R28 and R29 through resistor R24 to input 0B to increase the ON signal providing hysteresis. In the event of transient loss of anode current, SCR Q1 will be re-fired when power returns.

The third set of two AND conditions $\overline{\text{UNL}}\cdot\text{CT}$ in the above trip equation indicates a manual trip. For this purpose, switch SW1 is opened and maintained open to apply a "low" $\overline{\text{UNL}}$ signal to select input S1 while contact CT is closed applying a "high" CT signal to select input S0. This results in routing data from inputs 1A and 1B to the respective outputs. Since input 1A is grounded, output ZA is "low" and ineffective. However, a "high" is being applied from 12 volt conductor PC to input 1B and is routed to output ZB to fire controlled rectifier Q1 into conduction. As a result, the relay is tripped as hereinbefore described.

Following manual trip, UNL and CT are both low, selecting inputs 0A and 0B; 0A is at ground so that the relay cannot be set until switch SW1 is reclosed.

It will be apparent that following overload trip action, time delay circuit TD will provide thermal simulation to prevent resetting the relay until the line or load has cooled. Following such trip action, capacitor C7 will not be reset to zero charge but instead will retain the charge that caused tripping and it will leak off slowly in accordance with the cooling time of the load or wires. This capacitor will discharge slowly by current flow through resistors R15, R14 and R13. Also, it will be apparent that capacitor C6 could at times charge far above what is necessary to cause tripping so that it will continue to charge capacitor C7 after tripping if a heavy overload occurred. Then, both capacitors will discharge to simulate the cooling of the load or wires. As long as the charge on capacitor C7 is above the tripping value, the relay cannot be set because LOW enable $\overline{EA}$ is inhibited by overload trip signal OLT.

Resistor R30 connected from positive voltage conductor PC to turn-on signal input 2A and turn-off signal input OB of the multiplexer and resistor R31 connected from these two inputs to ground are compensating resistors that are used to compensate for input threshold tolerances of the multiplexer. One or the other of these resistors is used depending upon whether the multiplexer threshold is high or low and are shown as variable resistors for convenience. If such threshold is high, resistor R30 is connected in or adjusted to the desired value. On the other hand, if such threshold is low, resistor R31 is connected in instead or adjusted to the desired value to insure that the multiplexer outputs switch at the desired input voltage levels.

Resistor R32 and capacitor C12 in parallel across silicon controlled rectifier Q1 and zener diode ZD2 prevent the SCR from being rendered conducting by transient voltages.

Figure 5:
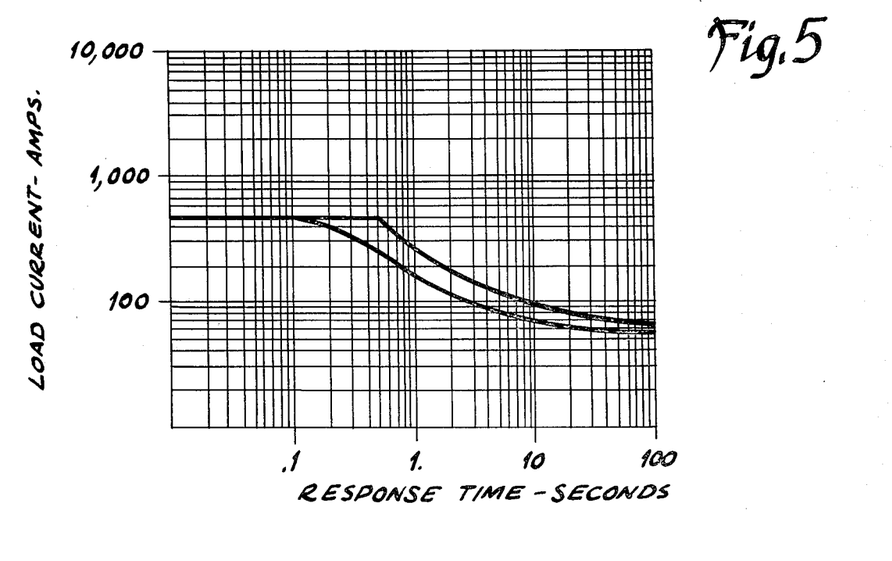
FIG. 5 is a graph showing the overload current response time operating characteristics of the remote power controller of FIGS. 1–2.

FIG. 5 shows operating characteristics of the invention in the form of a graph. In this graph, load current in amperes is plotted against response time in seconds. The system is arranged so that the relay will trip under the conditions within the outlines of this curve. It will be seen that if the current rises to 500 amps, the relay will trip in 0.1 to 0.5 second. At 100 amps, the system may take as long as 3 to 8 seconds to trip the relay.

Although a switch SW1 has been shown as a manual set control device for the control module circuit in FIG. 2, it will be apparent that other means such as an automatic control switch or electronic means such as a transistor may be used in place thereof. Resistor R33 is connected from control device input terminal X1 to common conductor CC to provide a leakage absorbing load for a transistor or the like that might be used as a control device. A capacitor C13 is connected from the junction between resistors R22 and R23 to common conductor CC to suppress electrical noise.

RESET LOCKOUT

The control system in FIG. 2 incorporates a reset lockout feature that prevents a direct resetting of relay 20 after overload tripping although the overload signal has terminated. Without such reset locking circuit, the relay could be reset by opening set control switch SW1, to interrupt maintenance of SCR Q1, and then reclosing this set control switch to set the relay as hereinbefore described under SET ACTION. However, this reset lockout feature prevents resetting by manipulation of set control switch SW1 alone but requires an additional manual operation, that is, opening set control switch SW1, then momentary opening of normally-closed reset switch RS followed by reclosing of set control switch SW1 as hereinafter more fully described. However, manual trip and set can still be controlled by set control switch SW1 alone as hereinbefore described because the reset lockout feature is operative only on overload trip as will hereinafter appear.

The reset lockout circuit is shown at the right-hand portion of FIG. 2 and comprises SCR Q3 and associated components identified in the following description of operation thereof.

It will be recalled from the foregoing description that overload trip signal OLT is applied to multiplex input 3B and also to enable input $\overline{EA}$ to effect tripping of the relay. This overload trip signal is simultaneously applied through voltage divider resistors R34 and R35 to ground and from the junction thereof to the gate of SCR Q3 to fire the latter into conduction. Capacitor C14 shunts noise from the gate to the cathode of SCR Q3 to prevent unwanted firing thereof. The anode of SCR Q3 will remain latched in the "low" state by holding current supplied from plus 12 volt conductor PC through resistor R36. This "low" state keeps the junction of resistors R19 and R20 and control signal UNL in a "low" state even if set switch SW1 is reclosed. Thus, select input S1 of the multiplexer is maintained "low" which prevents selection of input 2A that is necessary for setting the relay.

To release the reset lockout and allow resetting of the relay, set switch SW1 must be opened to assure interruption of the holding current to SCR Q1 and reset switch RS must be momentarily opened to interrupt the anode holding current to SCR Q3, thus rendering them nonconducting. The relay may then be set by reclosing set switch SW1 as hereinbefore described under SET ACTION.

While the apparatus hereinbefore described is effectively adapted to fulfill the objects stated, it is to be understood that the invention is not intended to be confined to the particular preferred embodiment of minimum size, integral, overload current sensing, remote power controller, with reset lockout disclosed, inasmuch as it is susceptible of various modifications without departing from the scope of the appended claims.

We claim:

1. In combination with an electrical system supplying a load device from an electrical power supply line having overload current sensing power control means for disconnecting said load device from said power supply line including a latching relay having contacts for controlling connection of said line to said load device and set and trip coils and a cutthroat contact in circuit with said trip coil that closes when said relay is set and reopens when said relay is tripped, means responsive to an overload current on said line for providing an overload trip signal, and control circuit means comprising a set switch and an integrated circuit dual multiplexer having first and second parts including sets of multiplexer inputs associated with first and second multiplexer outputs, respectively, a low enable input, and a pair of common select inputs for controlling said first and second multiplexer outputs, said first part of said dual multiplexer being operable to control setting of said relay in response to the Boolean equation:

$$SET = UNL \cdot \overline{CT} \cdot \overline{OLT} \cdot ON$$

wherein UNL is a combined status "on" signal indicative that the system has not latched into its tripped state and said set switch is "on", and $\overline{CT}$ is a cutthroat contact open indicative signal at said common select inputs, OLT is an overload trip "off" indicative signal at said low enable input, and ON is a set switch "on" indicative signal at the correspondingly selected input of said first set of multiplexer inputs, and said second part of said dual multiplexer being operable to control tripping of said relay in response to the Boolean equation:

$$TRIP = UNL \cdot CT \cdot OLT + \overline{UNL} \cdot \overline{CT} \cdot ON + \overline{UNL} \cdot CT$$

wherein UNL is said combined status signal and CT is a cutthroat contact closed indicative signal at said common select inputs and OLT is an overload trip "on" signal at the correspondingly selected input of said second set of multiplexer inputs or wherein $\overline{UNL}$ is a combined status "off" signal indicative that the system has either latched into its tripped state or said set switch is "off" and $\overline{CT}$ is said cutthroat contact open indicative signal at said common select inputs and ON is said set switch "on" indicative signal; or wherein said signals $\overline{UNL}$ and CT are at said common select inputs, the improvement comprising:
reset lockout means incorporated in said control circuit means for preventing resetting of said relay from said set switch following an overload trip comprising:
means responsive to an overload trip signal for introducing a reset lockout signal that alters said combined status "off" signal $\overline{UNL}$ to a modified combined status "off" signal $\overline{UNL}'$ additionally indicative that the system has latched into its reset lockout state, thus inhibiting said set combined status signal UNL at the corresponding select input of said multiplexer and rendering said set switch ineffective to cause resetting of said relay;
a reset switch;
and means responsive to momentary operation of said reset switch for disabling said inhibiting means while said set switch is held open thereby to re-establish the effectiveness of said set switch closure to reset said relay after an overload trip.

2. The combination claimed in claim 1, wherein:
said inhibiting means comprises:
a voltage source;
a gating type thyristor rendered conducting by said overload trip signal and being supplied with anode current from said voltage source through said reset switch whereby said anode remains latched in a "low" state;
and means for applying said "low" state of said anode to inhibit said UNL combined status signal at said multiplexer select input.

3. In an electrical system supplying a load device from an electrical power supply line having overload current sensing power control means for disconnecting said load device from said power supply line including a voltage source and a latching relay having contacts for controlling connection of said line to said load device and set and trip coils supplied from said voltage source and a cutthroat contact in circuit with said trip coil that closes when said relay is set and reopens when said relay is tripped, means responsive to an overload current on said line for providing an overload trip signal, and control circuit means comprising a set switch supplied from said voltage source and an integrated circuit dual multiplexer having first and second parts including sets of multiplexer inputs associated with first and second multiplexer outputs, respectively, and a pair of common select inputs and an enable input for controlling said first multiplexer output, said first part of said dual multiplexer being operable to control setting of said relay in response to an "on" signal ON at a selected input of said first set of multiplexer inputs in the absence of an overload trip signal OLT provided a cutthroat contact open indicative signal $\overline{CT}$ and a combined status indicative signal UNL are present at said common select inputs, said second part of said dual multiplexer being operable to control tripping of said relay in response to said overload trip signal OLT at a selected input of said second set of multiplexer inputs provided a cutthroat contact closed indicative signal CT and said combined status signal UNL are present at said common select inputs, the improvement comprising:
reset lockout means in said control circuit means for preventing resetting of said relay by operation of said set switch following an overload trip comprising:
a normally-closed reset switch supplied from said voltage source;
a gated current conducting device supplied from said voltage source through said reset switch and responsive to an overload trip signal for inhibiting said combined status signal at one of said common select inputs of said multiplexer thereby to prevent resetting said relay by said set switch alone;
and means responsive to momentary opening of said reset switch while said set switch is held open causing restoration of said current conducting device and termination of said inhibiting thereby to allow resetting of said relay by said set switch.

4. The electrical system claimed in claim 3, wherein:
said gated current conducting device is a silicon controlled rectifier.

5. In an electrical system supplying a load device from an electrical power supply line having overload current sensing power control means for disconnecting said load device from said power supply line including a voltage source and a latching relay having contacts for controlling connection of said line to said load device and set and trip coils supplied from said voltage source and a cutthroat contact in circuit with said trip coil that closes when said relay is set and reopens when said relay is tripped, means responsive to an overload current on said line for providing an overload trip signal, and control circuit means comprising a set switch supplied from said voltage source and an integrated circuit dual multiplexer having first and second parts including sets of multiplexer inputs associated with first and second multiplexer outputs, respectively, and a pair of common select inputs and an enable input for controlling said first multiplexer output, said first part of said dual mutliplexer being operable to control setting of said relay in response to an "on" signal ON at a selected input of said first set of multiplexer inputs in the absence of an overload trip signal OLT provided a cutthroat contact open indicative signal CT and a combined status indicative signal UNL are present at said common select inputs, said second part of said dual multiplexer being operable to control tripping of said relay in response to said overload trip signal OLT at a selected input of said second set of multiplexer inputs provided a cutthroat contact closed indicative signal CT and said combined status signal UNL are present at said common select inputs, and said dual multiplexer being operable to control manual tripping of said relay and resetting thereof in response to operation of said set switch, the improvement comprising:

reset lockout means in said control circuit means for preventing resetting of said relay by operation of said set switch following on overload trip while allowing resetting of said relay by operation of said set switch following manual tripping comprising:

a normally-closed reset switch supplied from said voltage source;

a gated current conducting device supplied from said voltage source through said reset switch and responsive to an overload trip signal for inhibiting said combined status signal at one of said common select inputs of said multiplexer thereby to prevent resetting said relay by closing said set switch;

and means responsive to momentary opening of said reset switch causing restoration of said current conducting device and termination of said inhibiting thereby to allow resetting of said relay by said set switch.

6. The electrical system claimed in claim 5, wherein: said gated current conducting device is a silicon controlled rectifier.

* * * * *